United States Patent
Oshima

(10) Patent No.: US 10,106,004 B2
(45) Date of Patent: Oct. 23, 2018

(54) AMPHIBIOUS VEHICLE

(71) Applicant: MITSUBISHI HEAVY INDUSTRIES, LTD., Tokyo (JP)

(72) Inventor: Takaaki Oshima, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 15/039,326

(22) PCT Filed: Nov. 10, 2014

(86) PCT No.: PCT/JP2014/079735
§ 371 (c)(1),
(2) Date: May 25, 2016

(87) PCT Pub. No.: WO2015/098317
PCT Pub. Date: Jul. 2, 2015

(65) Prior Publication Data
US 2017/0158010 A1 Jun. 8, 2017

(30) Foreign Application Priority Data
Dec. 27, 2013 (JP) .................. 2013-273463

(51) Int. Cl.
*B60F 3/00* (2006.01)
*B63B 1/28* (2006.01)
(Continued)

(52) U.S. Cl.
CPC .......... *B60F 3/0046* (2013.01); *B60F 3/0038* (2013.01); *B63B 1/286* (2013.01);
(Continued)

(58) Field of Classification Search
CPC ........ B63B 2001/325; B63B 2001/281; B63B 1/283; B63B 1/30; B63B 39/06; B63B 1/286; B60F 3/0038; B60F 3/0046
See application file for complete search history.

(56) References Cited

U.S. PATENT DOCUMENTS

| | | | | |
|---|---|---|---|---|
| 2,514,488 A | * | 7/1950 | Hale | ............... B60F 3/0038 440/12.56 |
| 6,520,104 B1 | * | 2/2003 | Svensson | ............ B63B 39/061 114/144 R |

(Continued)

FOREIGN PATENT DOCUMENTS

| JP | 49-034315 Y1 | 9/1974 |
|---|---|---|
| JP | 50-094000 U | 8/1975 |

(Continued)

OTHER PUBLICATIONS

English Translation of the Written Opinion of the International Searching Authority (Form PCT/ISA/237) for International Application No. PCT/JP2014/079735, dated Dec. 16, 2014.
(Continued)

*Primary Examiner* — Andrew Polay
(74) *Attorney, Agent, or Firm* — Birch, Stewart, Kolasch & Birch, LLP

(57) ABSTRACT

Provided is an amphibious vehicle capable of maintaining stable vehicle posture by pitching control during cruising on water and also reducing wave drag caused by waves on water. The amphibious vehicle according to the present invention is characterized by being provided with: a vehicle body (11) capable of moving on sea and land; a front flap (14A) with one end portion secured to a lower end portion of the vehicle body (11) in such a manner that a principal surface is inclined with respect to a front surface (11a) of the vehicle body (11); and a rear flap (14B) with one end portion secured to a lower end portion of a rear surface (11b) of the vehicle body (11).

17 Claims, 12 Drawing Sheets

(51) Int. Cl.
*B63B 39/06* (2006.01)
*B63B 43/14* (2006.01)
(52) U.S. Cl.
CPC ...... *B63B 39/061* (2013.01); *B63B 2043/145* (2013.01); *B63B 2207/00* (2013.01)

(56) References Cited

U.S. PATENT DOCUMENTS

| | | | |
|---|---|---|---|
| 8,808,042 B1 | 8/2014 | Hewitt | |
| 2010/0000462 A1* | 1/2010 | Morand | ................ B63B 39/061 114/284 |

FOREIGN PATENT DOCUMENTS

| | | | |
|---|---|---|---|
| JP | 1-162895 | U | 11/1989 |
| JP | 3-045489 | A | 2/1991 |
| JP | 9-076992 | A | 3/1997 |
| JP | 11-180392 | A | 7/1999 |
| JP | 11-342893 | A | 12/1999 |
| JP | 2003-226290 | A | 8/2003 |
| JP | 2005-53434 | A | 3/2005 |
| JP | 2010-536660 | A | 12/2010 |

OTHER PUBLICATIONS

International Search Report (PCT/ISA/210) issued in PCT/JP2014/079735, dated Dec. 16, 2014.
Written Opinion (PCT/ISA/237) issued in PCT/JP2014/079735, dated Dec. 16, 2014.

* cited by examiner

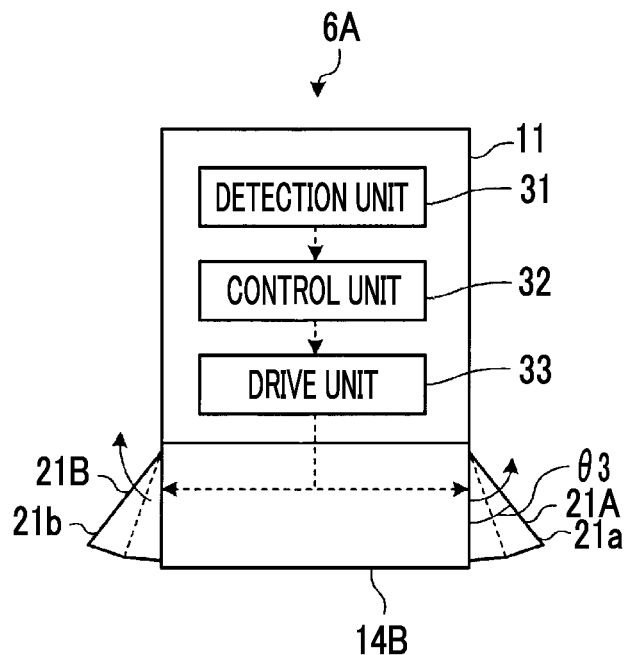
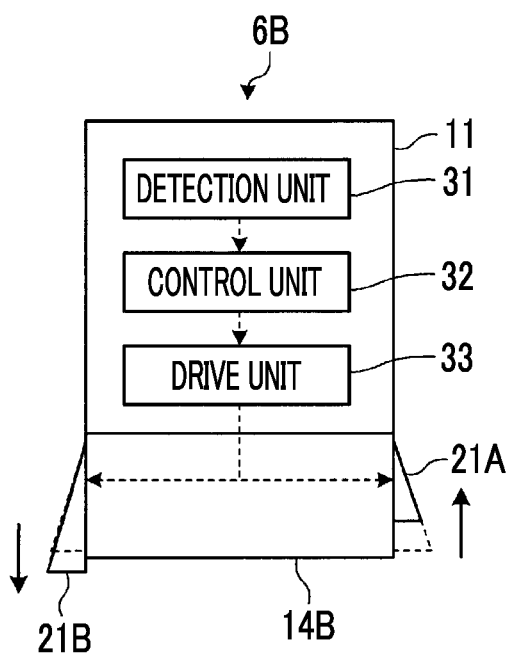

AMPHIBIOUS VEHICLE

TECHNICAL FIELD

The present invention relates to an amphibious vehicle, and particularly, to an amphibious vehicle which includes plate members provided on a front surface and a rear surface of the vehicle.

BACKGROUND ART

In the related art, a hydrofoil cruising on the sea is suggested (for example, refer to PTL 1). In the hydrofoil, by controlling angles of flaps provided on a front foil of a front portion and a rear foil of a rear portion of a hull submerged into water during sailing on the sea, deterioration in a posture of the hydrofoil, due to waves during sailing on the sea, is prevented.

CITATION LIST

Patent Literature

[PTL 1] Japanese Unexamined Patent Application Publication No. 3-45489

SUMMARY OF INVENTION

Technical Problem

However, in an amphibious vehicle capable of traveling on land and sailing on water, driving power of an engine is transmitted to tires via a driving power transmission path during traveling on land and the amphibious vehicle travels, and the driving power of the engine is transmitted to a propulsion unit such as a water-jet or a propeller via the driving power transmission path during sailing on water. In the amphibious vehicle, from the standpoint of sufficiently securing capacity of a passenger compartment of a vehicle body, it is preferable to form the shape of the vehicle body in an approximately rectangular parallelepiped shape.

However, in a case where the amphibious vehicle sails on water, since the amphibious vehicle sails in a state where the vehicle body floats on water, the posture of the amphibious vehicle may deteriorate due to influences such as waves on the surface of the water. Particularly, in a case where the vehicle sails on water at high speed (for example, 14 km/h or more), since a negative pressure is applied to the front surface of the vehicle, the front portion of the vehicle is likely to be submerged. Moreover, in the amphibious vehicle sailing on water, since the vehicle body is directly influenced by waves, there is a problem that resistance increases during sailing on water, and an amphibious vehicle in which a vehicle posture is stabilized by a pitching control during cruising on water is required.

The present invention is made in consideration of the above-described circumstances, and an object thereof is to provide an amphibious vehicle capable of maintaining a stable vehicle posture by a pitching control during cruising on water and also decreasing wave drag caused by waves on the surface of the water.

Solution to Problem

According to an aspect of the present invention, there is provided an amphibious vehicle, including: a vehicle body which is movable on water and land; a front plate member which has one end portion fixed to a lower end portion of the vehicle body such that a principle surface is inclined with respect to a front surface of the vehicle body; and a rear plate member which has one end portion fixed to a lower end portion of a rear surface of the vehicle body.

According to this configuration, since waves in the water pass through in a backward direction from a lower surface of the front plate member via a lower surface of the vehicle body during sailing on water, a lifting force is applied from the lower side of the front surface side of the vehicle body toward the upper side, and it is possible to decrease wave drag from the front surface of the vehicle body. Accordingly, even in a case where the amphibious vehicle cruises on the surface of the water at high speed (for example, 14 km/h or more), since the vehicle body glides over water, a posture of the vehicle body is stable, and it is possible to prevent the front portion of the vehicle body from becoming submerged. Therefore, it is possible to realize the amphibious vehicle capable of maintaining a stable vehicle posture by a pitching control during cruising on the surface of the water and also decreasing wave drag caused by waves on the surface of the water.

In the amphibious vehicle of the present invention, preferably, the front plate member is rotatably fixed to the vehicle body with a connection portion between the front plate member and the vehicle body as a rotary shaft. According to this configuration, in the amphibious vehicle, since it is possible to adjust the lifting force applied to the vehicle body by rotating the front plate member, it is possible to always maintain an optimal vehicle posture with respect to waves of the vehicle body. Therefore, not only is it possible to increase a maximum speed but also it is possible to prevent swinging of the vehicle body. Accordingly, it is possible to improve riding comfort, and it is possible to improve stability.

In the amphibious vehicle of the present invention, preferably, the rear plate member is rotatably fixed to the vehicle body with a connection portion between the rear plate member and the vehicle body as a rotary shaft. According to this configuration, in the amphibious vehicle, since it is possible to adjust the lifting force applied to the vehicle body by rotating the rear plate member, it is possible to always maintain an optimal vehicle posture with respect to waves of the vehicle body. Therefore, not only is it possible to increase a maximum speed but also it is possible to prevent swinging of the vehicle body. Accordingly, it is possible to improve riding comfort, and it is possible to improve stability.

In the amphibious vehicle of the present invention, preferably, the front plate member includes a lower plate member which has one end portion fixed to the lower end portion of the front surface of the vehicle body, and an upper plate member which has one end portion which is rotatably connected relatively to the lower plate member on the other end portion of the lower plate member. According to this configuration, in the amphibious vehicle, since it is possible to fold and store the front plate member provided on the front side of the vehicle body, when the amphibious vehicle lands from water, it is possible to compactly accommodate the front plate member on the front surface of the vehicle body.

In the amphibious vehicle of the present invention, preferably, in the front plate member, the other end portion of the upper plate member is fixable to the one end portion of the lower plate member. According to this configuration, in the amphibious vehicle, even in a case where the entire length of the front plate member is long, it is possible to fold and fix the front plate member. Therefore, even in a case where the vehicle body sails in a state of being floating on water during low speed sailing (for example, less than 14 km/h), a satisfactory field of vision from a vehicle window is obtained.

In the amphibious vehicle of the present invention, preferably, the front plate member is provided so as to be extendable and contractible in an in-plane direction of the principle surface of the front plate member. According to this configuration, in the amphibious vehicle, even in a case where the entire length of the front plate member is long, it is possible to extend and contract the front plate member. Therefore, even in a case where the vehicle body sails in a state of being floating on water during low speed sailing (for example, less than 14 km/h), a satisfactory field of vision from a vehicle window is obtained.

In the amphibious vehicle of the present invention, preferably, the front plate member is fixable to the front surface of the vehicle body. According to this configuration, in the amphibious vehicle, since it is possible to fix the front plate member to the front surface of the vehicle body, it is possible to compactly accommodate the front plate member on the front surface of the vehicle body.

In the amphibious vehicle of the present invention, preferably, the rear plate member is fixable to the rear surface of the vehicle body. According to this configuration, in the amphibious vehicle, since it is possible to fix the rear plate member to the rear surface of the vehicle body, it is possible to compactly accommodate the rear plate member on the rear surface of the vehicle body.

In the amphibious vehicle of the present invention, preferably, the amphibious vehicle further includes: a drive unit which drives the front plate member to change an angle between the vehicle body and the principle surface of the front plate member; a detection unit which detects an angle between the front surface of the vehicle body and the principle surface of the front plate member; and control unit which controls an angle between the front surface of the vehicle body and the front plate member based on the angle detected by the detection unit. According to this configuration, in the amphibious vehicle, since it is possible to always adjust the vehicle posture so as to maintain the optimal vehicle posture with respect to directions of waves, not only is it possible to increase a maximum speed but also to prevent swinging of the vehicle body. Accordingly, it is possible to improve riding comfort, and it is possible to improve stability.

In the amphibious vehicle of the present invention, preferably, a strengthening member which strengthens a flow of water and applies a lateral force in a vehicle width direction to the vehicle body is provided on a side surface of the rear plate member. In the amphibious vehicle, since the lateral force can be applied to the vehicle body, it is possible to control yawing of the vehicle body during sailing on water, and it is possible to improve forward advancing ability of the vehicle body.

In the amphibious vehicle of the present invention, preferably, the strengthening member has an approximately wedge shape in a sectional view. According to this configuration, in the amphibious vehicle, it is possible to decrease turbulence of a flow of water in the vicinity of the strengthening member, and it is possible to effectively apply the lateral force in the vehicle width direction to the vehicle body.

In the amphibious vehicle of the present invention, preferably, the strengthening member is rotatably provided on the rear plate member in the vehicle width direction of the vehicle body with a distal end portion in an advancement direction of the vehicle body as a support point. According to this configuration, in the amphibious vehicle, since it is possible to appropriately adjust the lateral force in the vehicle width direction, which is applied to the vehicle body, by rotating the strengthening member, the forward advancing ability of the vehicle body is improved, and it is possible to prevent the vehicle body from meandering in a rightward-leftward direction.

In the amphibious vehicle of the present invention, preferably, the strengthening member is movable frontward and rearward in the advancement direction of the vehicle body. According to this configuration, in the amphibious vehicle, since it is possible to appropriately adjust the lateral force in the vehicle width direction, which is applied to the vehicle body, by moving the strengthening member to the front side and the rear side of the vehicle body, the forward advancing ability of the vehicle body is improved, and it is possible to prevent the vehicle body from meandering in a rightward-leftward direction.

In the amphibious vehicle of the present invention, preferably, the amphibious vehicle further includes: a detection unit which detects an angle between the side surface of the rear plate member and the strengthening member and/or a position between the strengthening member and the rear plate member; a control unit which controls an angle between the rear plate member and the strengthening member based on the angle and the position detected by the detection unit; and a drive unit which drives the strengthening member with respect to the rear plate member to change the angle between the strengthening member and the rear plate member and/or the position between the strengthening member and the rear plate member. According to this configuration, in the amphibious vehicle, since it is possible to optimize the lateral force which is applied to the vehicle body, the forward advancing ability of the vehicle body is improved, and it is possible to prevent the vehicle body from meandering in a rightward-leftward direction.

In the amphibious vehicle of the present invention, preferably, the rear plate member has an accommodation space which can accommodate a portion of the strengthening member, and the strengthening member is configured so as to accommodate a portion of the strengthening member in the accommodation space. According to this configuration, in a case where the lateral force with respect to the vehicle body is not required, since the strengthening member can be stored in the storage space of the rear plate member, it is possible to prevent resistance during sailing on water from increasing, and it is possible to prevent deterioration of fuel consumption or the like.

In the amphibious vehicle of the present invention, preferably, an expansion portion, which expands in a direction separated from at least one side surface of the vehicle body, is provided on the one side surface. According to this configuration, in the amphibious vehicle, since a restoring force when the amphibious vehicle is inclined on water, even in a case where the amphibious vehicle is subjected to transverse waves, it is possible to decrease pitching and inclination of the vehicle.

In the amphibious vehicle of the present invention, preferably, an expansion amount of the expansion portion increases from the lower side of the vehicle body toward the upper side thereof. According to this configuration, in the amphibious vehicle, since it is possible to decrease resistance applied to the vehicle body due to waves on the ocean surface or the like, it is possible to improve propulsive performance of the vehicle body, and it is possible to improve stability, riding comfort, and fuel consumption.

In the amphibious vehicle of the present invention, preferably, the amphibious vehicle further includes: a detection unit which detects an inclination of the vehicle body; and a control unit which controls the expansion amount of the expansion portion based on the inclination detected by the detection unit. In the amphibious vehicle, for example, in a case where the vehicle body is inclined over a predetermined range due to transverse waves on the ocean surface with respect to the vehicle body, since it is possible to increase the expansion amount of the expansion portion on the both side surfaces of the vehicle body, it is possible to prevent rolling and overturn of the vehicle body. In addition, in the amphibious vehicle, for example, in a case where transverse waves on the ocean surface are calm, since it is possible to decrease resistance with respect to water during sailing of the vehicle body by decreasing the expansion amount of the expansion portion, it is possible to improve fuel consumption or the like.

In the amphibious vehicle of the present invention, preferably, the amphibious vehicle further includes a floating body tool which applies buoyancy of the vehicle body to at least one side surface of the vehicle body. According to this configuration, in the amphibious vehicle, unlike a case where the expansion portion is directly provided on the vehicle body, since it is appropriately adjust the number of the floating body tools attached to the vehicle body, it is possible to adjust the entire weight of the amphibious vehicle including the vehicle body, and it is possible to improve fuel consumption.

In the amphibious vehicle of the present invention, preferably, the floating body tool is detachably fixed to the vehicle body via a fixing tool which is provided on at least one side surface of the vehicle body. According to this configuration, in the amphibious vehicle, since it is easy to adjust the number of the floating body tools attached to the vehicle body, it is possible to easily adjust the entire weight of the amphibious vehicle including the vehicle body, and it is possible to improve fuel consumption.

Advantageous Effects of Invention

According to the present invention, it is possible to realize an amphibious vehicle capable of maintaining a stable vehicle posture by a pitching control during cruising on water and also decreasing wave drag caused by waves on the surface of the water.

BRIEF DESCRIPTION OF DRAWINGS

FIG. 9 is a planar schematic view showing an example of an amphibious vehicle according to a sixth embodiment.

FIG. 10 is a planar schematic view showing another example of the amphibious vehicle according to the sixth embodiment of the present invention.

DESCRIPTION OF EMBODIMENTS

Figure 1:
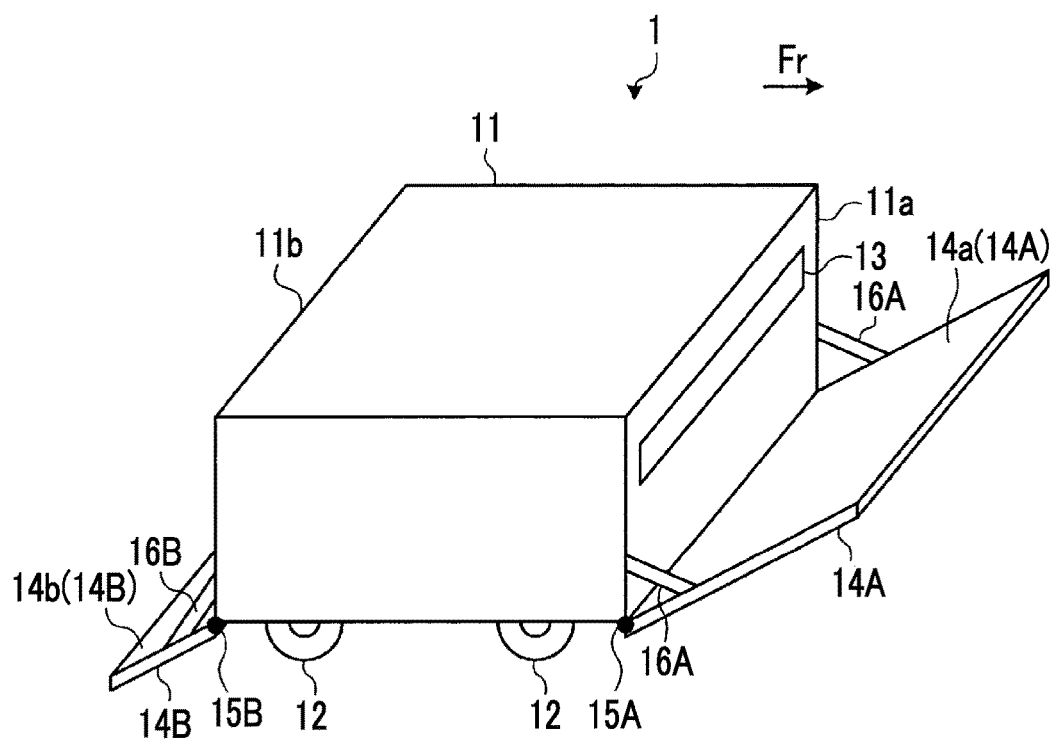
FIG. 1 is a perspective view schematically showing an amphibious vehicle according to a first embodiment.

Hereinafter, embodiments of the present invention will be described in detail with reference to the accompanying drawings. In addition, the present invention is not limited to embodiments below, and may be appropriately modified. Moreover, the embodiments below may be appropriately combined. In addition, the same reference numerals are assigned to components common to the embodiments, and overlapping descriptions thereof are omitted.

(First Embodiment)

FIG. 1 is a perspective view schematically showing an amphibious vehicle 1 according to a first embodiment of the present invention. As shown in FIG. 1, an amphibious vehicle 1 according to the present embodiment includes a vehicle body 11 having an approximately rectangular parallelepiped shape, and tires 12 (four in the present embodiment) which are provided on the lower portion of the vehicle body 11. A vehicle window 13 is provided on the upper portion of a front surface 11a in a travelling direction (advancement direction) Fr of the vehicle body 11 and a driver can view the outside through the vehicle window 13. One end portion of a front flap (front plate member) 14A is fixed to a lower end portion of the front surface 11a of the vehicle body 11. The front flap 14A is attached to the lower end portion of the front surface 11a of the vehicle body 11 via a hinge 15A such that a principle surface 14a is inclined with respect to the front surface 11a of the vehicle body 11. The front flap 14A has a width corresponding to a vehicle width of the vehicle body 11. The front flap 14A is attached to the vehicle body 11 via an extendable and contractible support member 16A which has one end fixed to the lower end portion of the vehicle body 11 such that the principle surface 14a has a predetermined angle θ1 (not shown in FIG. 1, and refer to FIG. 2) between the front flap 14A and the front surface 11a of the vehicle body 11.

In addition, one end portion of a rear flap (rear plate member) 14B is fixed to a lower end portion of a rear surface 11b of the vehicle body 11. The rear flap 14B is attached to the lower end portion of the rear surface 11b of the vehicle body 11 via a hinge 15B such that a principle surface 14b is inclined with respect to the rear surface 11b of the vehicle body 11. The rear flap 14B has a width corresponding to a vehicle width of the vehicle body 11. The rear flap 14B is attached to the vehicle body 11 via an extendable and contractible support member 16B which has one end fixed to the lower end portion of the vehicle body 11 such that the principle surface 14b has a predetermined angle θ2 (not shown in FIG. 1, and refer to FIG. 2) between the rear flap 14B and the rear surface 11b of the vehicle body 11.

Moreover, in the present embodiment, the example in which flat plate members are used as the front flap 14A and the rear flap 14B is described. However, the shapes of the front flap 14A and the rear flap 14B may be appropriately modified so as to be a plate member such as corrugated plate other than a flat plate within a range in which effects of the present invention can be obtained. In addition, the widths of the front flap 14A and the rear flap 14B may be appropriately modified within the range in which effects of the present invention can be obtained. In addition, in the present embodiment, the example in which the front flap 14A and the rear flap 14B are attached to the vehicle body 11 by the hinges 15A and 15B is described. However, the front flap 14A and the rear flap 14B do not necessarily need to be fixed to the vehicle body 11 using the hinges 15A and 15B, as long as the front flap 14A and the rear flap 14B can be fixed to the vehicle body 11 such that the principle surfaces 14a and 14b have the predetermined angles θ1 and θ2 between the front surface 11a and the rear surface 11b of the vehicle body 11, and the front flap 14A and the rear flap 14B. Moreover, in the present embodiment, the example in which the front flap 14A and the rear flap 14B are fixed to the vehicle body 11 by the support members 16A and 16B is described. However, the front flap 14A and the rear flap 14B do not necessarily need to be fixed to the vehicle body 11 via the support members 16A and 16B.

Figure 2:
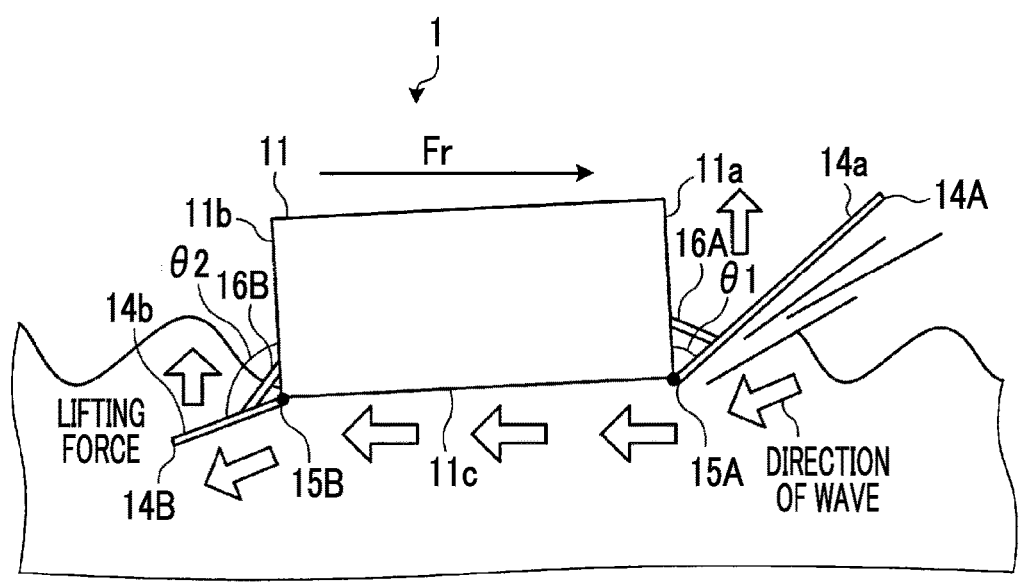
FIG. 2 is a schematic view during sailing on water of the amphibious vehicle according to the first embodiment.

FIG. 2 is a side view during sailing on water of the amphibious vehicle 1. As shown in FIG. 2, in the amphibious vehicle 1 according to the present embodiment, the front flap 14A is attached to the lower end portion of the front surface 11a of the vehicle body 11 such that the principle surface 14a of the front flap 14A has an acute angle θ1 with respect to the front surface 11a of the vehicle body 11. Accordingly, in the amphibious vehicle 1, since waves on the surface of the water pass through in a backward direction from the lower surface of the front flap 14A via a lower surface 11c of the vehicle body 11 during sailing on water, a lifting force is applied from the lower side of the front surface 11a side of the vehicle body 11 toward the upper side, it is possible to decrease wave drag from the front surface 11a of the vehicle body 11. Accordingly, even in a case where the amphibious vehicle 1 cruises on water at high speed (for example, 14 km/h or more), since the vehicle body 11 glides over water, a posture of the vehicle body 11 is stable, and it is possible to prevent the front portion of the vehicle body 11 from becoming submerged. In addition, from the standpoint of further increasing the above-described effects, preferably, the front flap 14A is provided on the lower end of the front surface 11a of the vehicle body 11.

Moreover, in the amphibious vehicle 1 according to the present embodiment, the rear flap 14B is attached to the lower end portion of the rear surface 11b of the vehicle body 11 such that the principle surface 14b of the rear flap 14B has an obtuse angle θ2 with respect to the rear surface 11b of the vehicle body 11. Accordingly, in the amphibious vehicle 1, since waves on the surface of the water pass by the rear side of the vehicle body 11 from the lower surface 11c of the vehicle body 11 via the lower surface of the rear flap 14B during sailing on water, a lifting force is applied from the lower side of the rear surface 11b side of the vehicle body 11 toward the upper side, it is possible to decrease wave drag from the front surface 11a side of the vehicle body 11. Accordingly, even in a case where the amphibious vehicle 1 cruises on water at high speed (for example, 14 km/h or more), since the vehicle body 11 glides over water, a posture of the vehicle body 11 is stable, and it is possible to prevent the front portion of the vehicle body 11 from becoming submerged. In addition, from the standpoint of further increasing the above-described effects, preferably, the rear flap 14B is provided on the lower end of the rear surface 11b of the vehicle body 11.

(Second Embodiment)

Figure 3A:
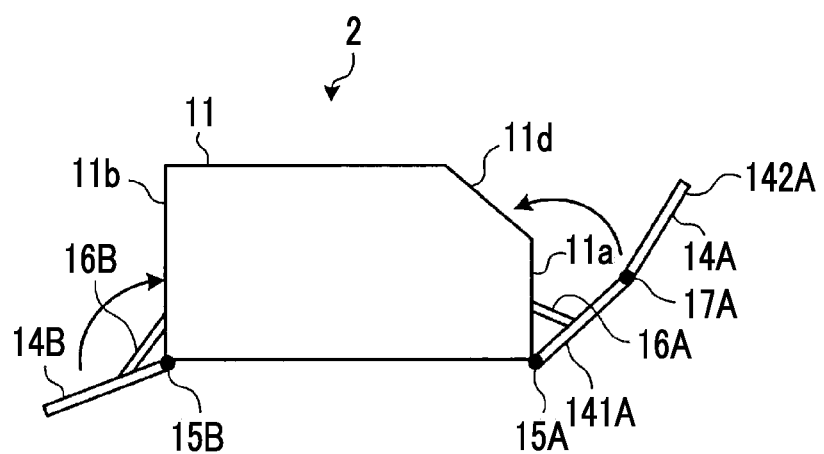
FIG. 3A is a side view showing an amphibious vehicle according to a second embodiment of the present invention.
Figure 3B:
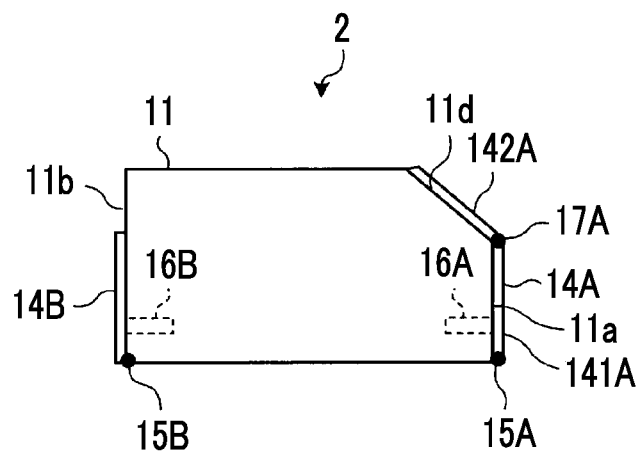
FIG. 3B is a side view showing the amphibious vehicle according to the second embodiment of the present invention.

FIGS. 3A and 3B are side views showing an amphibious vehicle 2 according to a second embodiment of the present invention. As shown in FIG. 3A, the amphibious vehicle 1 has an inclined surface 11d on the upper portion of the front surface 11a of the vehicle body 11. In the amphibious vehicle 1, the front flap 14A of the front surface 11a side of the vehicle body 11 includes a lower flap (lower plate member) 141A which has one end portion fixed to the lower end portion of the front surface 11a of the vehicle body 11, and a upper flap (upper plate member) 142A which has one end portion fixed to the other end portion of the lower flap 141A via the hinge 17A. In addition, similarly to the front flap 14A and the rear flap 14B, the lower flap 141A and the upper flap 142A may be appropriately modified so as to be a plate member such as a corrugated plate other than the flat plate within a range in which effects of the present invention can be obtained.

The principle surface of the lower flap 141A has a width corresponding to the front surface 11a of the vehicle body 11, and the lower flap 141A is fixed to the lower end portion of the front surface 11a of the vehicle body 11 via the hinge 15A and the support member 16A so as to be rotatably relative to the front surface 11a of the vehicle body 11. The principle surface of the upper flap 142A has a width corresponding to the inclined surface 11d of the vehicle body 11, and the upper flap 142A is fixed to the lower flap 141A via the hinge 17A so as to be rotatably relative to the lower flap 141A. The lower flap 141A is configured so as to be fixed to the front surface 11a of the vehicle body 11 by a fixing member (not shown). The upper flap 142A is configured so as to be fixed to the inclined surface 11d of the front surface 11a of the vehicle body 11 by a fixing member (not shown). The support member 16A is provided so as to be extendable and contractible in a front-rear direction in the advancement direction of the vehicle body 11.

In addition, the hinge 15A is driven by a drive unit (not shown) and the lower flap 141A may be fixed such that the principle surface of the lower flap 141A is rotatable with respect to the front surface 11a of the vehicle body 11, and the support member 16A is driven by a drive unit (not shown) and the lower flap 141A may be fixed such that the principle surface of the lower flap 141A is rotatable with respect to the front surface 11a of the vehicle body 11. In addition, the hinge 15A is driven by a drive unit (not shown), and the upper flap 142A may be fixed such that the principle surface of the upper flap 142A is rotatable with respect to the front surface 11a of the vehicle body 11.

In addition, in the amphibious vehicle 2, the rear flap 14B of the rear surface 11b side of the vehicle body 11 is fixed so as to be rotatably relative to the rear surface 11b of the vehicle body 11 via the hinge 15B. The rear flap 14B is configured so as to be fixed to the rear surface 11b of the vehicle body 11 by a fixing member (not shown). In addition, the hinge 15B is driven by a drive unit (not shown) and the rear flap 14B may be fixed such that the principle surface of the rear flap 14B is rotatable with respect to the rear surface 11b of the vehicle body 11, and the support member 16B is driven by a drive unit (not shown) and the rear flap 14B may be fixed such that the principle surface of the rear flap 14B is rotatable with respect to the rear surface 11b of the vehicle body 11.

As shown in FIG. 3B, for example, in the amphibious vehicle 2, the lower flap 141A of the front flap 14A can be fixed to the front surface 11a of the vehicle body 11 during travelling on land, and the upper flap 142A can be fixed to the inclined surface 11d. In addition, in the amphibious vehicle 1, the rear flap 14B can be fixed to the rear surface 11b of the vehicle body 11. The support member 16A can be accommodated in an accommodation space (not shown) which is provided in the front surface 11a of the vehicle body 11, and the support member 16B can be accommodated in the accommodation space (not shown) which is provided in the rear surface 11b of the vehicle body 11. In this way, in the amphibious vehicle 2, the front flap 14A which is provided on the front side of the vehicle body 11 is configured so as to be folded by the lower flap 141A and the upper flap 142A which can be folded to each other, and it is possible to compactly accommodate the front flap 14A in the front surface 11a of the vehicle body 11 when the amphibious vehicle 2 lands from water. In addition, similarly, it is possible to compactly accommodate the rear flap 14B, which is provided on the rear side of the vehicle body 11, in the rear surface 11b of the vehicle body 11.

(Third Embodiment)

Figure 4:
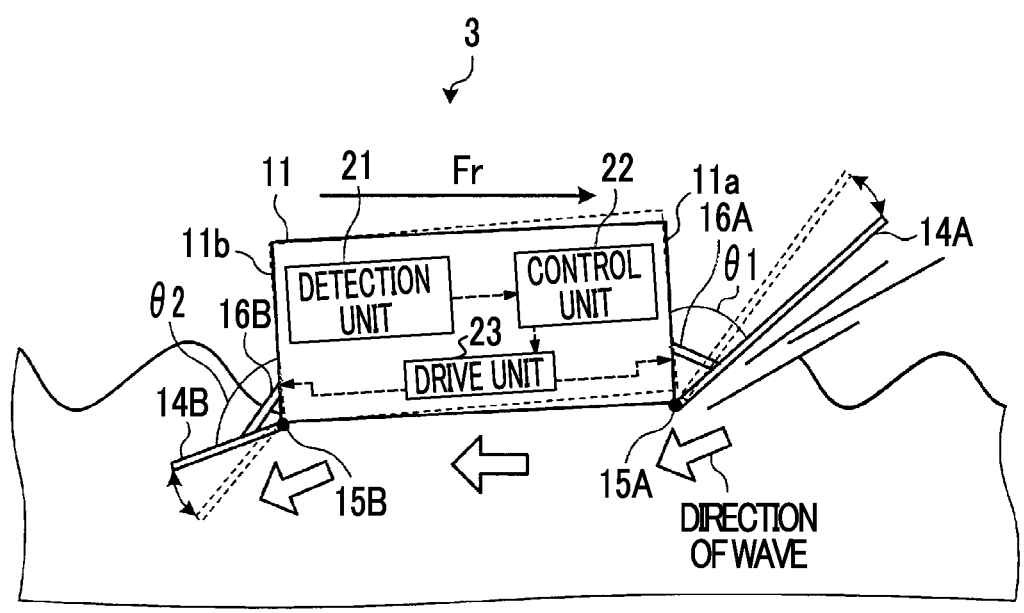
FIG. 4 is a side view showing an amphibious vehicle according to a third embodiment.

FIG. 4 is a side view showing an amphibious vehicle according to a third embodiment. As shown in FIG. 4, an amphibious vehicle 3 includes a detection unit 21 which detects the angle θ1 between the front surface 11a of the vehicle body 11 and the front flap 14A and the angle θ2 between the rear surface 11b of the vehicle body 11 and the rear flap 14B, and a control unit 22 which controls the angle θ1 between the front surface 11a of the vehicle body 11 and the front flap 14A and the angle θ2 between the rear surface 11b of the vehicle body 11 and the rear flap 14B so as to be required angles, based on the angles θ1 and θ2 detected by the detection unit 21. In addition, the amphibious vehicle 3 includes a drive unit 23 which drives and rotates the front flap 14A and the rear flap 14B such that the angles reach the angles θ1 and θ2 calculated by the control unit 22. The detection unit 21 is particularly not limited as long as effects of the present invention can be obtained, and it is possible to use various angle sensors, various acceleration sensors, or the like which detect a speed in a pitching direction applied to the vehicle body 11. The drive unit 23 is particularly not limited as long as effects of the present invention can be obtained, and for example, it possible to use various actuators or the like.

In the amphibious vehicle 3, the detection unit 21 detects the angles θ1 and θ2 at all times during sailing on water, and the detected angles θ1 and θ2 are input to the control unit 22. The control unit 22 determines whether or not the angles θ1 and θ2 detected by the detection unit 21 is within a predetermined range which is preset according to a cruising speed of the vehicle 3. Moreover, in a case where the angles θ1 and θ2 are outside the preset range, the control unit 22 calculates angles which are required so as to allow the angles θ1 and θ2 to be within the preset range, and the calculated angles are input to the drive unit 23. The drive unit 23 drives the support members 16A and 16B and rotates the front flap 14A and the rear flap 14B with the hinges 15A and 15B as the support points so as to allow the angles θ1 and θ2 to be within the preset range. According to this control, in the amphibious vehicle 3, since it is possible to adjust the vehicle posture so as to maintain the optimal vehicle posture with respect to the directions of waves, not only is it possible to increase the maximum speed but also to prevent swinging of the vehicle body 11. Accordingly, it is possible to improve riding comfort, and it is possible to improve stability. In addition, in the above-described embodiments, the example in which the drive unit 23 drives the support members 16A and 16B to rotate the front flap 14A and the rear flap 14B is described. The drive unit 23 may rotate the hinges 15A and 15B so as to rotate the front flap 14A and the rear flap 14B.

(Fourth Embodiment)

Figure 5A:
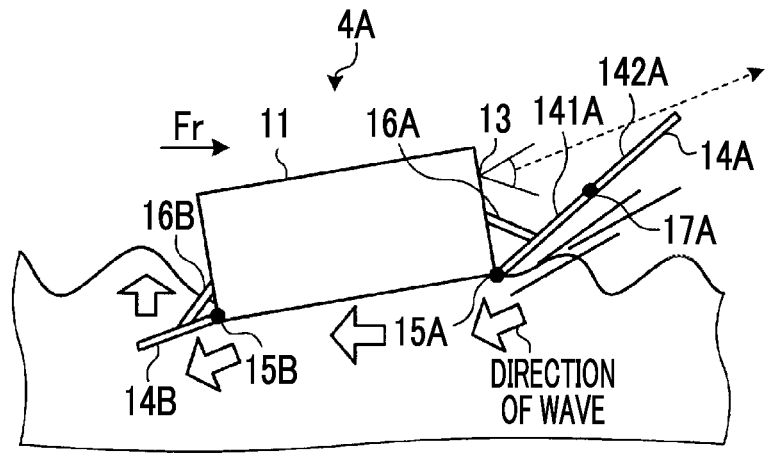
FIG. 5A is a side view showing an amphibious vehicle according to a fourth embodiment.
Figure 5B:
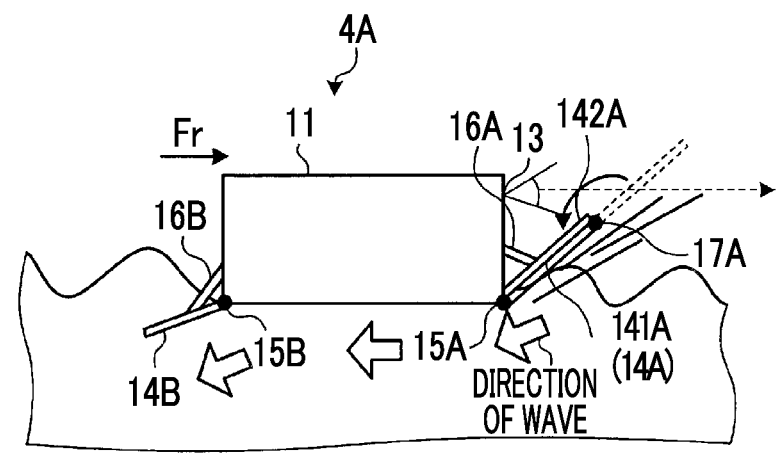
FIG. 5B is a side view showing the amphibious vehicle according to the fourth embodiment.

FIGS. 5A and 5B are side views showing an amphibious vehicle according to a fourth embodiment of the present invention. As shown in FIGS. 5A and 5B, in an amphibious vehicle 4A, the front flap 14A includes the lower flap 141A which has one end portion fixed to the lower end portion of the front surface 11a of the vehicle body 11 via the hinge 15A, and the upper flap 142A which has one end portion fixed to the other end portion of the lower flap 141A via the hinge 17A. The upper flap 142A is rotatably connected relative to the lower flap 141A via the hinge 17A, and is configured so as to be fixed to overlap the lower flap 141A by a fixing member (not shown).

In the amphibious vehicle 4A, in a case where the amphibious vehicle 4A sails on water at high speed (for example, 14 km/h or more), since the vehicle body 11 glides water, even in a case where a length of the front flap 14A is long, an improved field of vision is obtained from the vehicle window 13. Meanwhile, in a case where the amphibious vehicle 4A sails on water at low speed (for example, less than 14 km/h), since the vehicle body 11 sails in a state of being float on water, a field of vision from the vehicle window 13 may fail if the length of the front flap 14A is too long. Accordingly, in the amphibious vehicle 4A, since the front flap 14A is configured such that the lower flap 141A is rotatably relative to the upper flap 142A, particularly, in a case where the vehicle body 11 sails in a state of being floated on water when the amphibious vehicle 4A sails on water at low speed, it is possible to decrease the entire length of the front flap 14A, and an improved field of vision from the vehicle window 13 is obtained.

Figure 5C:
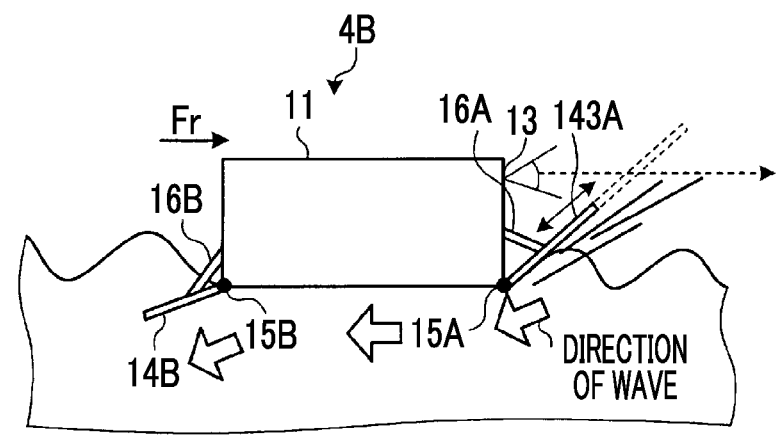
FIG. 5C is a side view showing the amphibious vehicle according to the fourth embodiment.

FIG. 5C is a view showing another example of the amphibious vehicle according to the present embodiment. In an amphibious vehicle 4B, the front flap 143A is configured so as to be extendable and contractible in an in-plane direction (refer to an arrow in FIG. 5C) of the front flap 143A. For example, in the front flap 143A, the principle surface of the front flap 143A is formed in a bellow shape along the vehicle width direction of the vehicle body 11, and the principle surface of the front flap 143A can be configured so as to be extendable and contractible in the in-plane direction. Similarly to the example shown in FIGS. 5A and 5B, according to this configuration, an improve field of vision from the vehicle window 13 can be obtained when the amphibious vehicle sails on water at low speed or the like.

(Fifth Embodiment)

Figures 6, 7:
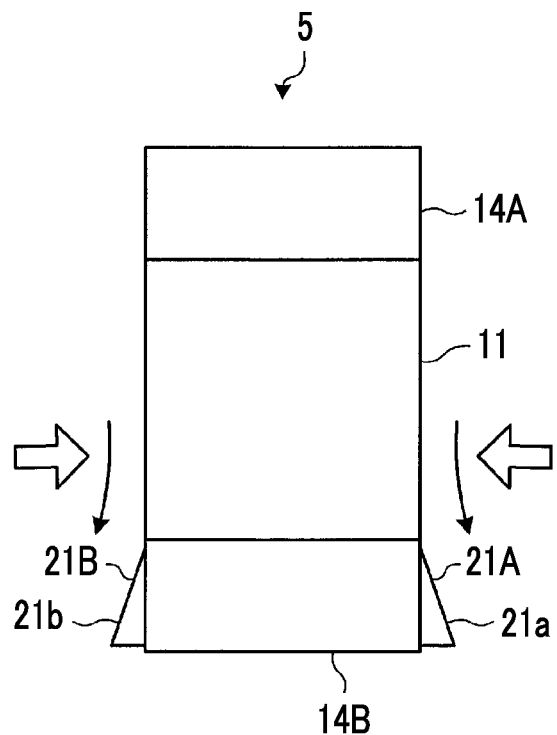
FIG. 6 is a planar schematic view of an amphibious vehicle according to a fifth embodiment.
FIG. 7 is a planar schematic view showing an example of a fin.

FIG. 6 is a planar schematic view of an amphibious vehicle 5 according to a fifth embodiment of the present invention. As shown in FIG. 6, the amphibious vehicle 5 according to the present embodiment includes a pair of fins (strengthening members) 21A and 21B which is provided on both side surfaces of the rear flap 14B in addition to the configurations of the amphibious vehicles according to the above-describe first to fourth embodiments. The pair of fins 21A and 21B includes inclined surfaces 21*a* and 21*b* which are provided so as to be inclined in the advancement direction of the vehicle body 11, and when the amphibious vehicle 5 sails on water, the fins 21A and 21B have a function (refer to arrows of solid lines in FIG. 5) of strengthening water flowing from the front side of the vehicle body 11 toward the rear side so as to flow the side of the vehicle body 11. Accordingly, in the amphibious vehicle 5, since a lateral force in the vehicle width direction can be applied to the vehicle body 11, it is possible to control yawing of the vehicle body 11 during sailing on water, and it is possible to improve forward advancing ability of the vehicle body 11. Moreover, although it is described in detail below, the fins 21A and 21B do not necessarily need to be provided on both sides of the fins 21A and 21B, and the fins 21A and 21B may be provided on at least one side of the vehicle body 11.

In the amphibious vehicle 5 according to the present embodiment, with respect to the fin 21A (fin 21B is also similar), it is possible to appropriately modify the shapes and the numbers of the fins 21A attached to the vehicle body 11 according to conditions of a water surface (for example, a tide in the sea). FIG. 7 is a planar schematic view showing an example of the fin 21A. As shown in FIG. 7, fins 212A to 214A which have approximately triangular shapes in a plan view and have shapes different from the shape of a fin 211A are connected to an inclined surface 211*a* of the fin 211A having an approximately triangular shape in a plan view, and the connected components can be used as the fin 21A. In the example shown in FIG. 7, inclinations of inclined surfaces 212*a* to 214*a* of the fins 21A in the advancement direction of the vehicle body 11 increase in an order of the inclined surfaces 212*a*, 213*a*, and 214*a* of the fins 21A. In this way, in the present embodiment, since the inclination angles of the inclined surfaces 212*a* to 214*a* of the fins 21A in the advancement direction of the vehicle body 11 can be changed, it is possible to adjust the force in the vehicle width direction applied to the vehicle body 11, and a yawing control is more easily performed. In addition, by forming the shape of the fin 21A provided on the surface of one flap 14B in the vehicle width direction and the shape of the fin 21B provided on the surface of the other flap 14B in the vehicle width direction so as to be different from each other, it is possible to adjust the magnitude of the force applied in the vehicle width direction of the vehicle body 11.

Figure 8A:
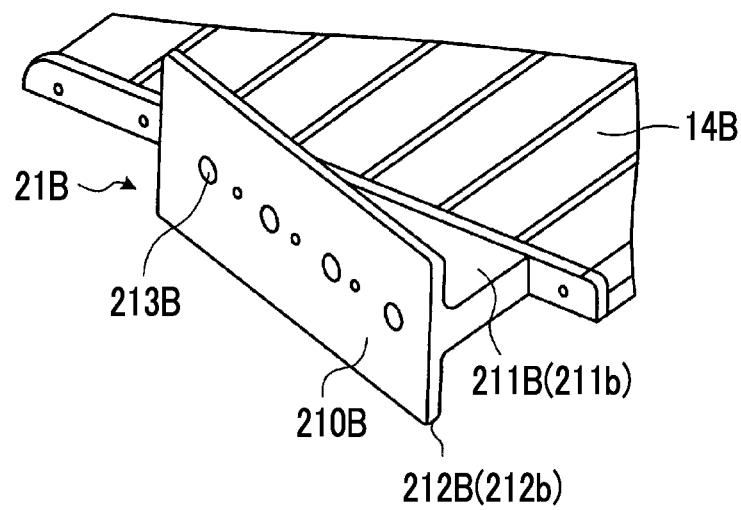
FIG. 8A is a perspective view schematically showing an example of a fin.
Figure 8B:
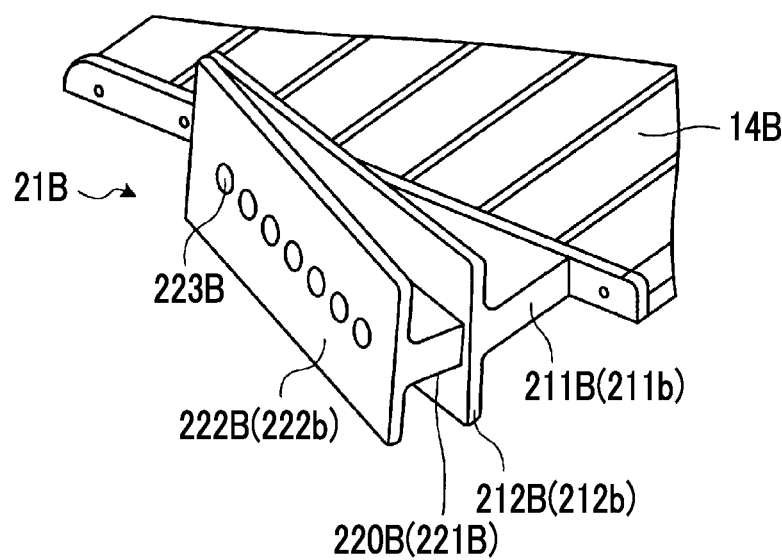
FIG. 8B is a perspective view schematically showing an example of a fin.

Next, the shapes of the fins 21A and 21B will be described in detail. FIGS. 8A and 8B are perspective views schematically showing the fin 21B. In addition, in FIGS. 8A and 8B, the fin 21B is described. However, the fin 21A also may have the same configuration. As shown in FIGS. 8A and 8B, the fin 21B (210B) has an approximately wedge shape in a sectional view, and includes a connection portion 211B in which one end portion is fixed to the side surface of the flap 14B and which has approximately the same thickness as that of the rear flap 14B, and an extension portion 212B which extends from the other end portion of the connection portion 211B and has a principle surface 212*b* approximately orthogonal to a principle surface 211*b* of the connection portion 211B. The principle surface 212*b* of the extension portion 212B is provided so as to have a predetermined angle in the advancement direction of the vehicle body 11. In addition, screw holes 213B are provided on the principle surface 212*b* of the extension portion 212B. As described in FIG. 7, the screw holes 213B are provided in the case where the fin 21B is constituted of the plurality of fins.

As shown in FIG. 8B, in a case where the fin 21B is constituted of two fins 210B and 220B, a connection portion 221B of the fin 220B is fixed using the screw holes 213B of the fin 210B. Screw holes 223B are provided on an extension portion 222B of the fin 220B. Another fin is connected to the fin 220B by the screw holes 223B, and can be used as the fin 21B.

As shown in FIGS. 8A and 8B, by using the fin 21B (fin 21A) having an approximately wedge shape in a sectional view, it is possible to decrease turbulence in the flow of water flowing the connection portion 211B due to the connection portion 211B having approximately the same thickness as that of the rear flap 14B. In addition, since the principle surface 212*b* approximately orthogonal to the principle surface 211*b* of the connection portion 211B is provided and the principle surface 212*b* has the extension portion 212B having a predetermined angle in the advancement direction of the vehicle body 11, it is possible to apply the lateral force in the vehicle width direction to the vehicle body 11. Accordingly, for example, in a state where the fins 21A and 21B are not provided and the vehicle body 11 turns right, it is possible to apply the lateral force to the vehicle body 11 from the right side to the left side by attaching the fin 21A to the left side of the vehicle body 11. Accordingly, since the lateral force is applied to the inner side of the rear portion of the vehicle body 11, moment is applied around the center of gravity of the vehicle body 11, the vehicle body is inclined left with respect to the travelling direction Fr, and the vehicle body 11 can straightly travel. Similarly, in a state where the fins 21A and 21B are not provided and the vehicle body 11 turns left, since it is possible to apply the lateral force to the vehicle body 11 from the left side to the right side by attaching the fin 21B to the right side of the vehicle body 11, the vehicle body 11 can straightly travel. In addition, since the fin 21B (the fin 21A also is similar) is used by appropriately combining the plurality of fins 210B and the fins 220B, it is possible to minutely adjust the lateral force applied to the vehicle body 11. Accordingly, it is possible to further improve the forward advancing ability of the vehicle body 11.

(Sixth Embodiment)

FIG. 9 is a planar schematic view showing an example of an amphibious vehicle according to a sixth embodiment of the present invention. As shown in FIG. 9, an amphibious vehicle 6A includes a detection unit 31 which detects the magnitude of the lateral force applied to the vehicle body 11, a control unit 32 which controls an angle θ3 between inclined surfaces 21*a* and 21*b* of the fins 21A and 21B and the advancement direction of the vehicle body 11 based on the lateral force detected by the detection unit 31, and a drive unit 33 which drives the fins 21A and 21B and sets the angle θ3 of at least one of the inclined surfaces 21*a* and 21*b* with respect to the fins 21A and 21B to the angle detected by the control unit 32. The detection unit 31 is particularly not limited as long as effects of the present invention can be obtained, and it is possible to use various angle sensors, various acceleration sensors, or the like which detect a speed in a pitching direction applied to the vehicle body 11. The drive unit 33 is particularly not limited as long as effects of the present invention can be obtained, and for example, it possible to use various actuators or the like. In addition, for example, the angle θ3 of each of the fins 21A and 21B can be controlled using the fin 21B in which the connection portion 211B of the above-described fin 210B shown in FIG. 8A is constituted of an extendable and contractible member having a bellow structure.

In the amphibious vehicle 6A, during sailing on water, the detection unit 31 detects the lateral force applied to the vehicle body 11 by the detection unit 31 at all times, and the magnitude of the detected lateral force is input to the control unit 32. The control unit 32 determines whether or not the lateral force detected by the detection unit 31 is within a predetermined range which is preset according to the cruising speed. Moreover, in a case where the lateral force is outside the preset range, the control unit 32 calculates the angle θ3 which is required so as to allow the lateral force to be within the preset range, and the calculated angle θ3 is input to the drive unit 33. The drive unit 33 drives the fins 21A and 21B and rotates the inclined surfaces 21a and 21b of the fins 21A and 21B with the distal end portions of the fins 21A and 21B as the support points so as to allow the angle θ3 to be within the preset range. According to this control, in the amphibious vehicle 6A, since it is possible to optimize the lateral force applied to the vehicle body 11, it is possible to improve the forward advancing ability of the vehicle body 11, and it is possible to prevent the vehicle body 11 from meandering in the right-left direction.

FIG. 10 is a planar schematic view showing another example of the amphibious vehicle according to the sixth embodiment of the present invention. As shown in FIG. 10, an amphibious vehicle 6B includes the detection unit 31 which detects the magnitude of the lateral force applied to the vehicle body 11, the control unit 32 which controls the positions of the fins 21A and 21B in the front-rear direction of the vehicle body 11 based on the lateral force detected by the detection unit 31, and the drive unit 33 which drives the fins 21A and 21B and sets the positions of the fins 21A and 21B in the front-rear direction of the vehicle body 11 to the detections detected by the control unit 32. Since other configurations are similar to those of the amphibious vehicle 6A shown in FIG. 9, descriptions thereof are omitted.

Figure 11A:
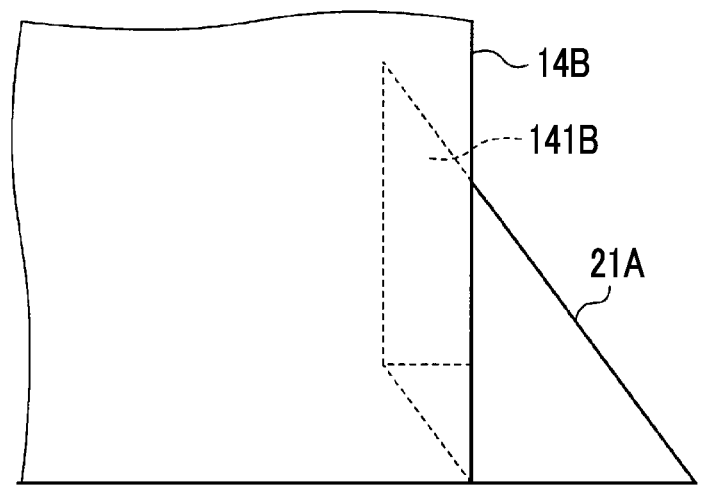
FIG. 11A is a view showing an example of a configuration of a fin of the amphibious vehicle according to the sixth embodiment.
Figure 11B:
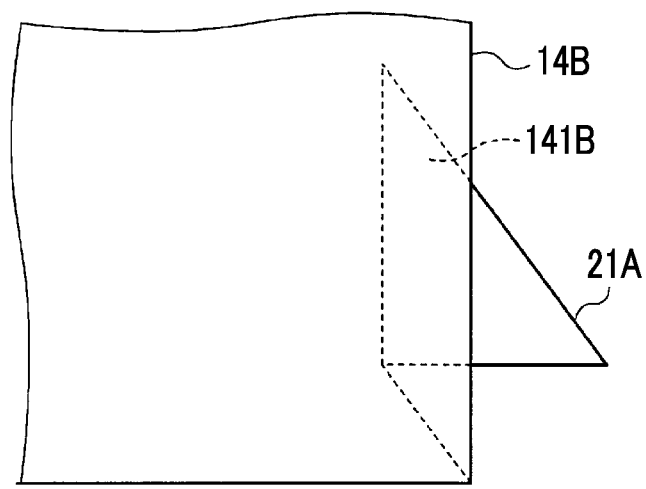
FIG. 11B is a view showing an example of the configuration of the fin of the amphibious vehicle according to the sixth embodiment.

FIGS. 11A and 11B are views showing an example of the configuration of the fin 21A of the amphibious vehicle 6B according to the present embodiment. In addition, in FIGS. 11A and 11B, the fin 21A is used. However, the fin 21B also may have the same configuration as that of the fin 21A.

In the example shown in FIGS. 11A and 11B, an accommodation portion 141B which can store a portion of the fin 21A is provided on one end portion in the vehicle width direction of the rear flap 14B. The fin 21A is configured so as to be driven to be inclined in the advancement direction of the vehicle body 11 by a drive unit (not shown), the fin 21A slidably moves, and a portion of the fin 21A is accommodated in the accommodation portion 141B. Accordingly, it is possible to adjust the front and rear positions of the fin 21A in the advancement direction of the vehicle body 11. In this way, by adjusting the front and rear positions of the fins 21A in the advancement direction of the vehicle body 11, it is possible to control the area of the fin 21A with respect to the water received from the front side of the vehicle body 11. Accordingly, it is possible to control the magnitude of the lateral force in the vehicle width direction applied to the vehicle body 11.

(Seventh Embodiment)

In general, in a case where an amphibious vehicle having an approximately rectangular parallelepiped shape cruises on water or moors on water, the vehicle body rolls due to transverse waves, and lateral pitching may occur. In addition, in a case where the amphibious vehicle sails on water or turns, a centrifugal force occurs due to the turning, moment occurs in the roll direction with respect to the vehicle body, and the vehicle body may be inclined. Accordingly, there is a concern that overturn of the vehicle may occur, riding comfort may deteriorate, or the like. Particularly, in a case where the amphibious vehicle sails on the sea, large resistance is applied to the vehicle body due to waves on the ocean surface, and propulsive performance and fuel consumption of the vehicle body may deteriorate.

Accordingly, by further providing having a predetermined shape on the amphibious vehicle which has the above-described front flap 14A and rear flap 14B and has an approximately rectangular parallelepiped shape, the inventors found that it was possible to decrease the above-described lateral pitching and moment caused by the rolling, and the resistance applied to the vehicle body due to waves on the ocean surface.

Figure 12:
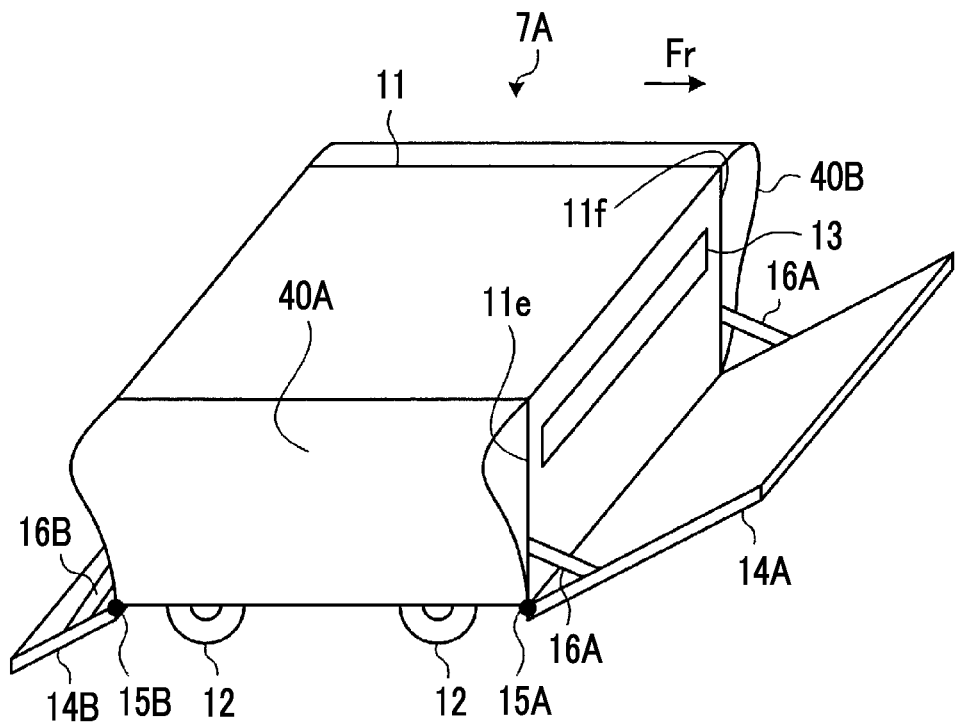
FIG. 12 is a view schematically showing an example of an amphibious vehicle according to a seventh embodiment.

FIG. 12 is a perspective view schematically showing an example of an amphibious vehicle according to a seventh embodiment of the present invention. As shown in FIG. 12, in addition to the above-described front flap 14A and rear flap 14B, an amphibious vehicle 7A according to the present embodiment includes an expansion portion 40A which is provided on a right surface 11e of the vehicle body 11 and expands in a direction separated from the right surface 11e, and an expansion portion 40B which is provided on a left surface 11f of the vehicle body 11 and expands in a direction separated from the left surface 11f. The expansion portions 40A and 40B are not particularly limited as long as they have a configuration capable of obtaining buoyancy with respect to water, and may have a hollow structure or a solid structure.

Figure 13:
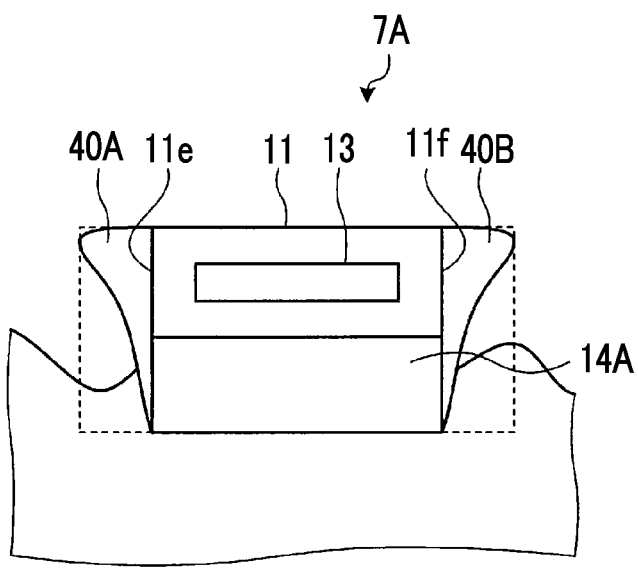
FIG. 13 is a front view of the amphibious vehicle according to the seventh embodiment.

FIG. 13 is a front view of the amphibious vehicle 7A. As shown in FIG. 13, the amphibious vehicle 7A has an approximately trapezoidal shape in a front view, and has a configuration in which expansion amounts of the expansion portions 40A and 40B increase from the lower side of the vehicle body 11 toward the upper side thereof. That is, an oblique side of each of the expansion portions 40A and 40B is curved and has an approximately right-angled triangular shape in a front view, and each of the expansion portions 40A and 40B has a streamlined shape which is warped outward from the lower side of the vehicle body 11 toward the upper side thereof. According to this configuration, unlike the case where the expansion portions 40A and 40B are not provided in the vehicle body 11 and the vehicle body 11 has an approximately rectangular parallelepiped shape, in the amphibious vehicle 7A, a restoring force on water increases. Accordingly, even in a case where the vehicle body is subjected to transverse waves, it is possible to decrease pitching and inclination of the vehicle. In addition, in the amphibious vehicle 7A, since both sides of the vehicle body 11 have streamlined shapes, it is possible to decrease resistance applied to the vehicle body 11 due to waves on the ocean surface or the like. Accordingly, it is possible to improve propulsive performance of the vehicle body 11 and it is possible to improve stability, riding comfort, and fuel consumption.

Moreover, in the above-described embodiment, the example in which each of the expansion portions 40A and 40B has a streamlined shape which is warped outward from the lower side of the vehicle body 11 toward the upper side thereof is described. However, the shapes of the expansion portions 40A and 40B are not limited to the configurations. For example, each of the expansion portions 40A and 40B may have a streamlined shape which is warped inward from the lower side of the vehicle body 11 toward the upper side thereof, or may have a configuration in which the expansion amounts from both side surfaces 11e and 11f increase in stages from the lower side of the vehicle body 11 toward the upper side thereof. Moreover, in the above-described embodiment, the example in which the amphibious vehicle 7A has an approximately trapezoidal shape in a front view is described. However, the expansion portions 40A and 40B having approximately convex shapes in a front view may be provided in the amphibious vehicle 7A.

Figure 14:
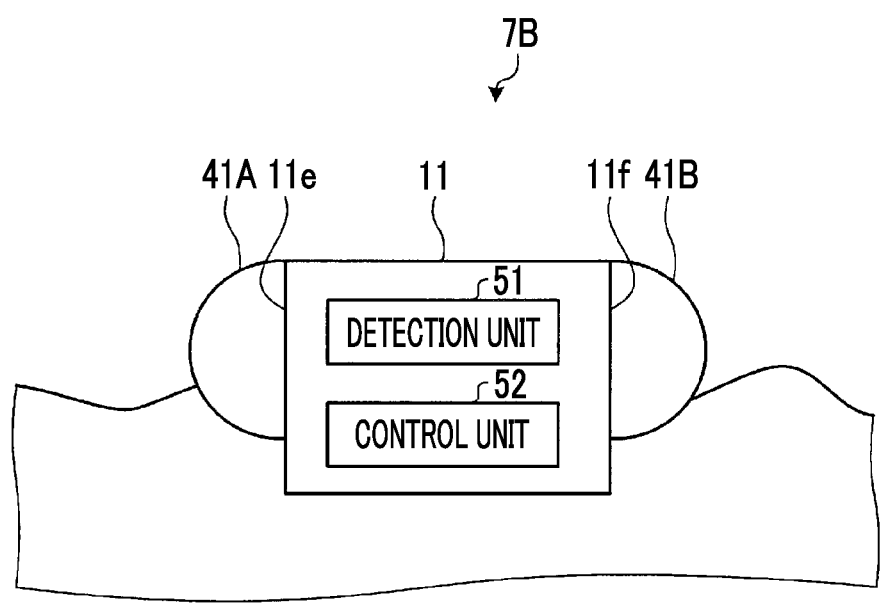
FIG. 14 is a front view showing another example of the amphibious vehicle according to the seventh embodiment.

FIG. 14 is a front view showing another example of the amphibious vehicle according to the present embodiment. Moreover, in FIG. 14, for easy descriptions, the vehicle window 13 and the front flap 14A are omitted. As shown in FIG. 14, an amphibious vehicle 7B has an approximately oval shape in a front view. The expansion portions 41A and 41B expand in an approximately hemispherical shape from both side surfaces 11e and 11f of the vehicle body 11, and have the maximum expansion amount on the upper portion of the vehicle body 11. Moreover, in the amphibious vehicle 7B, each of the expansion portions 41A and 41B is constituted of a member having a variable expansion amount such as an airbag.

The amphibious vehicle 7B includes a detection unit 51 which detects inclination of the vehicle body 11, and a control unit 52 which controls the expansion amounts of the expansion portions 41A and 41B based on the inclination detected by the detection unit 51. The detection unit 51 is particularly not limited as long as effects of the present invention can be obtained, and it is possible to use various angle sensors, various acceleration sensors, or the like which detect the inclination of the vehicle body 11 or acceleration in the rolling direction applied to the vehicle body 11. According to this configuration, for example, in the amphibious vehicle 7B, in a case where the vehicle body 11 is inclined over a predetermined range due to transverse waves on the ocean surface applied to the vehicle body 11, it is possible to prevent rolling and overturn of the vehicle body 11 by increasing the expansion amounts on both side surfaces 11e and 11f of the vehicle body 11. In addition, for example, in the amphibious vehicle 7B, in a case where transverse waves on the ocean surface are calm, it is possible to decrease resistance with respect to water during sailing of the vehicle body 11 by decreasing the expansion amounts of the expansion portions 41A and 41B. In addition, in the amphibious vehicle 7B, it is possible to absorb and alleviate impact with respect to the vehicle body 11 in a case where the expansion portions 41A and 41B are constituted of airbags. Accordingly, it is possible to improve stability without providing additions such as an impact absorbing material on the outside of the vehicle body 11.

Figure 15:
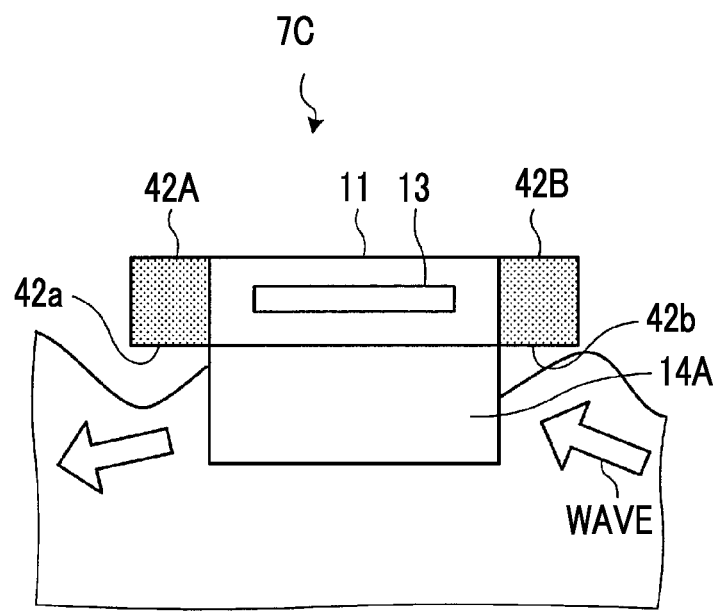
FIG. 15 is a front view showing another example of the amphibious vehicle according to the seventh embodiment.
Figure 16:
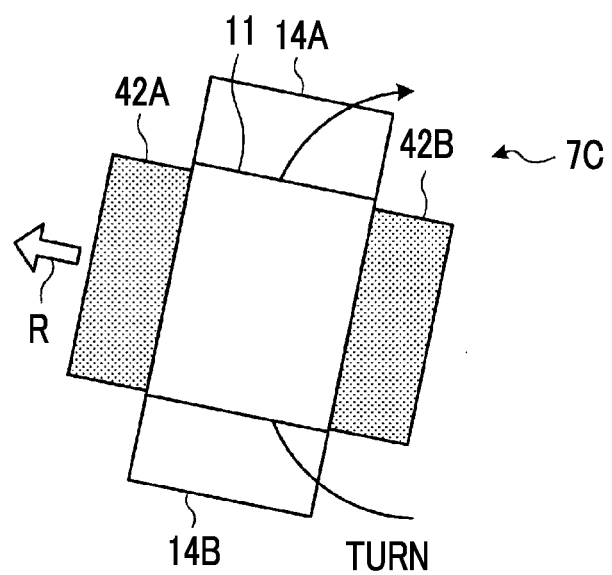
FIG. 16 is an explanatory view of a turning state of another example of the amphibious vehicle according to the seventh embodiment.

FIG. 15 is a front view showing another example of the amphibious vehicle according to the present embodiment, and FIG. 16 is an explanatory view of a turning state of another example of the amphibious vehicle according to the present embodiment. As shown in FIG. 15, an amphibious vehicle 7C has an approximately convex shape toward the lower side in a front view. In the amphibious vehicle 7C, buoyancy bodies 42A and 42B having approximately rectangular parallelepiped shapes are fixed to the upper end of the vehicle body 11. In addition, in the amphibious vehicle 7C, the buoyancy bodies 42A and 42B are directly attached to both side surfaces of the vehicle body 11 as attachable and detachable members above the waterline of the vehicle body 11. Other configurations are the same as those of the amphibious vehicle 7B shown in FIG. 14, and descriptions thereof are omitted.

In the amphibious vehicle 7C, since the buoyancy bodies 42A and 42B are provided on both sides of the vehicle body 11, even in a case where the vehicle body 11 is inclined due to transverse waves, lower surfaces 42a and 42b of the buoyancy bodies 42A and 42B come into contact with a water surface, and buoyancy is secured. Accordingly, it is possible to prevent rolling and overturn of the vehicle body 11. In addition, for example, in the amphibious vehicle 7C, as shown in FIG. 16, in a case where the vehicle body 11 turns in a right direction, a centrifugal force R with respect to the vehicle body 11 is applied in the vehicle width direction, and the vehicle body 11 inclined over a predetermined range, the lower surface 42a of the floating body tool 42A which is provided on the waterline in the vehicle body 11 comes into contact with the water surface. Accordingly, in the amphibious vehicle 7C, it is possible to prevent rolling and overturn during sailing on water, and it is possible to further improve stability. In addition, even when the amphibious vehicle sails on water during bad weather, it is possible to secure stability of the vehicle body 11.

Figure 17:
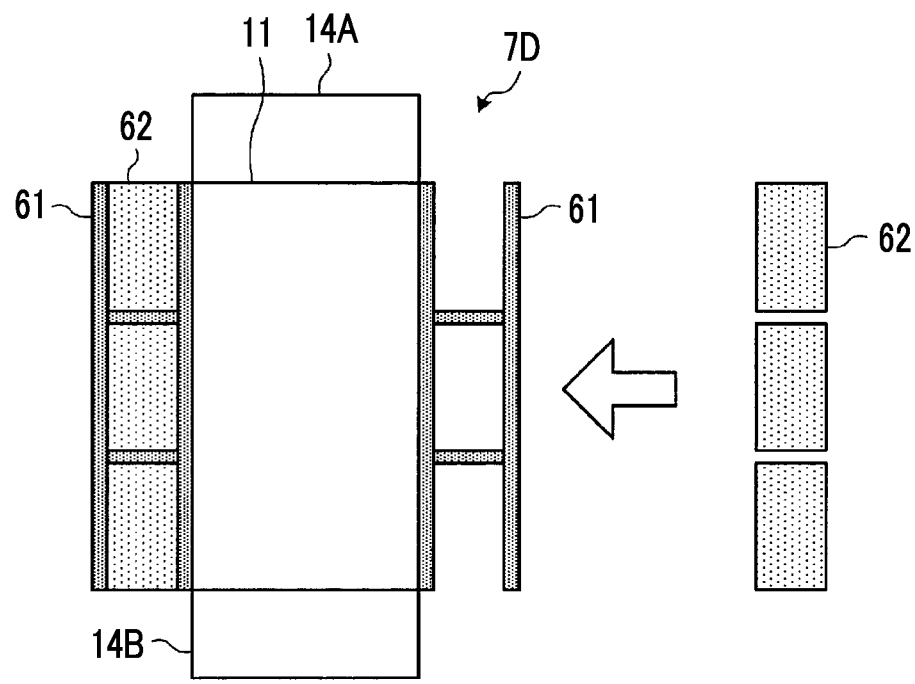
FIG. 17 is a plan view showing another example of the amphibious vehicle according to the seventh embodiment.
Figure 18:
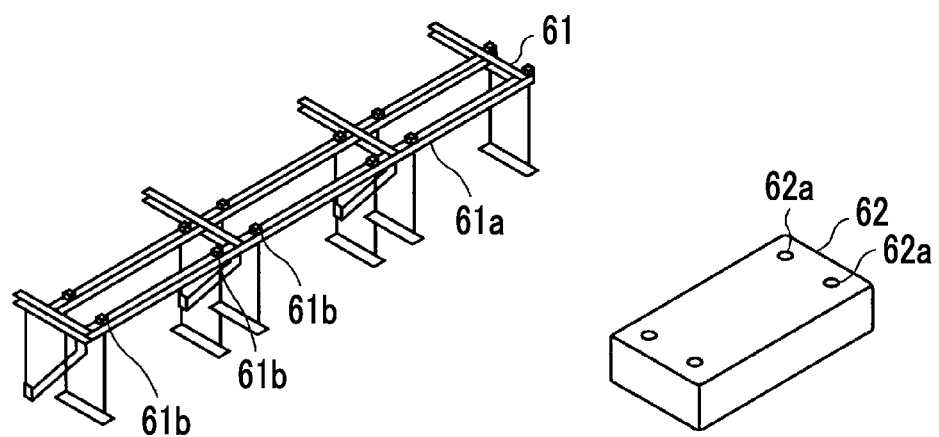
FIG. 18 is an explanatory view of a fixing jig and a floating body tool according to the seventh embodiment.

FIG. 17 is a plan view showing another example of the amphibious vehicle according to the present embodiment. As shown in FIG. 17, the floating body tools 42A and 42B of the above-described amphibious vehicle 7C can be attached and detached. In an amphibious vehicle 7D, fixing jigs 61 are provided on the upper end portions on both sides of the vehicle body 11, and a plurality of jigs (six in the present embodiment) having approximately rectangular parallelepiped shapes are provided so as to be attachable to and detachable from the fixing jigs (panel materials) 61. As shown in FIG. 18, in the fixing jig 61, a plurality of attachment portions 61b of the floating body tools 62 are provided on a plurality of posts 61a which are provided in a lattice shape. A plurality of screw holes 62a are provided on each of the floating body tools 62. The floating body tool 62 can be attached to the fixing jig 61, which is fixed to the upper portion above the waterline of the vehicle body 11, via the screw holes 62a. According to this configuration, since it is possible to appropriately adjust the number of the floating body tools 62 attached to the vehicle body 11 in a case where the floating body tools are directly attached to the vehicle body 11, it is possible to adjust the entire weight of the amphibious vehicle 7D including the vehicle body 11, and it is possible to improve fuel consumption or the like.

REFERENCE SIGNS LIST 1, 2, 3, 4A, 4B, 5, 6A, 6B, 7A to 7D: amphibious vehicle
11: vehicle body
11a: front surface
11b: rear surface
11c: lower surface
11d: inclined surface
11e and 11f: side surface
12: tire
13: vehicle window
14A: front flap (front plate member)
141A: lower flap (lower plate member)
142A: upper flap (upper plate member)
14B: rear flap (rear plate member)
141B: accommodation portion
15A and 15B: hinge 16A and 16B: support member
17A: hinge
21, 31, and 51: detection unit
22, 32, and 52: control unit
23 and 33: drive unit
21A, 21B, 211A to 214A, 210B, and 220B: fin (strengthening member)
21a, 21b, and 211a to 214a: inclined surface
211B and 221B: connection portion
212B and 222B: extension portion
213B and 223B: screw hole
40A, 40B, 41A, and 41B: expansion portion
42A and 42B: floating body tool
61: fixing jig
61a: post
61b: attachment portion
62: floating body tool
62a: screw hole

The invention claimed is:

1. An amphibious vehicle, comprising:
a vehicle body which is movable on water and land;
a front plate member which has one end portion fixed to a lower end portion of the vehicle body such that a principle surface is inclined with respect to a front surface of the vehicle body;
a rear plate member which has one end portion fixed to a lower end portion of a rear surface of the vehicle body;
a fin, as a strengthening member, that applies a lateral force in a vehicle width direction to the vehicle body is provided on a side surface of the rear plate member, the fin having a wedge shape in a sectional view, having a triangular shape in plan view, and configured to connect, on an inclined surface of the fin, with another fin different from the fin,
wherein the vehicle body has approximately rectangular parallelepiped shape such that waves on a surface of water pass through in a backward direction from a lower surface of the front plate member via a lower surface of the vehicle body during sailing on water.

2. The amphibious vehicle according to claim 1,
wherein the front plate member is rotatably fixed to the vehicle body with a connection portion between the front plate member and the vehicle body as a rotary shaft.

3. The amphibious vehicle according to claim 1,
wherein the rear plate member is rotatably fixed to the vehicle body with a connection portion between the rear plate member and the vehicle body as a rotary shaft.

4. The amphibious vehicle according to claim 1,
wherein the front plate member includes a lower plate member which has one end portion fixed to the lower end portion of the front surface of the vehicle body, and an upper plate member which has one end portion which is rotatably connected relatively to the lower plate member on the other end portion of the lower plate member.

5. The amphibious vehicle according to claim 4,
wherein in the front plate member, the other end portion of the upper plate member is fixable to the one end portion of the lower plate member.

6. The amphibious vehicle according to claim 1,
wherein the front plate member is fixable to the front surface of the vehicle body.

7. The amphibious vehicle according to claim 1,
wherein the rear plate member is fixable to the rear surface of the vehicle body.

8. The amphibious vehicle according to claim 1, further comprising:
a support member, one end of which being fixed to the lower end portion of the vehicle body and another end of which being fixed to the front plate member, the support member being extendable and contractable;
an actuator driving the front plate member to change an angle between the vehicle body and the principle surface of the front plate member;
one of an angle sensor and an acceleration sensor, as a detector, that detects the angle between the front surface of the vehicle body and the principle surface of the front plate member;
wherein the front plate member is rotatably fixed to the vehicle body with a connection portion between the front plate member and the vehicle body as a rotary shaft, and
the actuator drives, based on the angle detected by the detector, the support member and rotates the front plate member with about the support point as the connection portion, and controls the angle between the front surface of the vehicle body and the front plate member.

9. The amphibious vehicle according to claim 1, further comprising:
an actuator that
rotates the strengthening member provided on the rear plate member in the vehicle width direction of the vehicle body with a distal end portion in an advancement direction of the vehicle body as a support point.

10. The amphibious vehicle according to claim 1, further comprising:
an actuator that
moves the strengthening member frontward and rearward in the advancement direction of the vehicle body in plan view.

11. The amphibious vehicle according to claim 1, further comprising:
one of an angle sensor and an acceleration sensor, as a detector, that detect an angle between the side surface of the rear plate member and the strengthening member and/or a position between the strengthening member and the rear plate member; and
an actuator driving the strengthening member with respect to the rear plate member to change the angle between the strengthening member and the rear plate member and/or the position between the strengthening member and the rear plate member, wherein
the actuator changes the angle between the rear plate member and the strengthening member based on the angle and the position detected by the detector.

12. The amphibious vehicle according to claim 1,
wherein the rear plate member has an accommodation space which can accommodate a portion of the strengthening member, and the strengthening member is configured so as to accommodate a portion of the strengthening member in the accommodation space.

13. The amphibious vehicle according to claim 1,
wherein an airbag that expands in a direction separated from at least one side surface of the vehicle body, is provided on the one side surface.

14. The amphibious vehicle according to claim 13, further comprising:
a first airbag provided on a right surface of the vehicle body and expands in a direction away from the right surface, and a second airbag provided on a left surface of the vehicle body and expands in a direction away from left surface, wherein the first and second airbags have buoyancy with respect to water, and increase an expansion amount of the expansion portion from the lower side of the vehicle body toward the upper side of the vehicle body.

15. The amphibious vehicle according to claim 13, further comprising:
one of an angle sensor and an acceleration sensor, as a detector, that detect an inclination of the vehicle body,
a controller; and
a first airbag provided on a right surface of the vehicle body and expands in a direction away from the right surface, and a second airbag provided on a left surface of the vehicle body and expands in a direction away from the left surface,
wherein when the first and second airbags have buoyancy with respect to water and each has a variable expansion amount, and
the controller is configured to, when the inclination of the vehicle body exceeds a predetermined range, increases the expansion amount of the first and second airbags, based on the inclination detected by the detector.

16. The amphibious vehicle according to claim 1, further comprising:
an airbag, as a float, that applies buoyancy to at least one side surface of the vehicle body.

17. The amphibious vehicle according to claim 16, wherein the float is detachably fixed to the vehicle body via a plurality of posts provided in a lattice shape that are provided on at least one side surface of the vehicle body.

* * * * *